United States Patent [19]
Fonss et al.

[11] Patent Number: 5,004,962
[45] Date of Patent: Apr. 2, 1991

[54] AUTOMATIC MOTOR SYNCHRONIZER

[75] Inventors: Jack G. Fonss, San Jose; Howard Z. Silverberg, Los Gatos; Martin H. Gardiner, Sunnyvale, all of Calif.

[73] Assignee: Arrow Marine, Inc., Santa Clara, Calif.

[21] Appl. No.: 458,085

[22] Filed: Dec. 28, 1989

[51] Int. Cl.⁵ .............................. B63H 25/02
[52] U.S. Cl. ........................ 318/85; 318/77; 318/588
[58] Field of Search ............. 318/85, 66, 69, 74, 318/77, 79, 588, 50, 45, 41, 268, 278, 705, 715, 719, 721; 388/810, 814, 912, 909; 440/2, 84, 87, 1; 114/144 A, 144 RE

[56] References Cited
U.S. PATENT DOCUMENTS

| | | |
|---|---|---|
| 3,351,831 | 11/1967 | Hemphill et al. ............ 318/77 |
| 3,870,935 | 3/1975 | Abels et al. ............ 318/85 X |
| 4,135,118 | 1/1979 | Seeger et al. ............ 318/41 X |
| 4,308,489 | 12/1981 | Bergmann ............ 318/77 |
| 4,559,482 | 12/1985 | Fencl ............ 318/50 |
| 4,739,236 | 4/1988 | Burkenpas ............ 318/85 X |

OTHER PUBLICATIONS

"The Glendinning Automatic Twin Engine Synchronizer", Sturdy Marine, Sep. 29, 1987.
"Digital Engine Synchronizer", Sturdy Marine, Sep. 21, 1988.

Primary Examiner—William M. Shoop, Jr.
Assistant Examiner—A. Jonathan Wysocki
Attorney, Agent, or Firm—Fliesler, Dubb, Meyer & Lovejoy

[57] ABSTRACT

An automatic synchronizer 20 includes a throttle rod 62 which provides a direct link between the slave motor throttle lever 44 and the slave motor 36. A microprocessor system 30 provides a signal to a bi-directional synchronization motor 58 dependent on the difference in speed between a master reference motor 34 and the slave motor 36. Depending on this signal, the synchronization motor 58 positions the throttle rod 62 in order to directly effect the speed of the slave motor 36 and to reposition the slave motor throttle lever 44 to a position appropriate to the speed of the slave motor 36. Once synchronization has occurred, an electrically operated clutch 60 is deactivated such that a normal force will move the slave throttle lever 44.

21 Claims, 9 Drawing Sheets

AUTOMATIC MOTOR SYNCHRONIZER

FIELD OF THE INVENTION

The present invention is directed to a mechanism for automatically causing the speed of a slave motor be synchronized with the speed of a master motor.

BACKGROUND OF THE INVENTION

With respect to large dual motor devices and in particular dual motor marine craft, it is important that the speed of the motors be synchronized in order to greatly enhance the smoothness and comfort of the ride and also reduce maintenance and ensure longevity with respect to the craft. Significant vibrations can occur with unsynchronized dual motors on a marine craft. These vibrations in addition to causing annoying noises, reduce the overall efficiency of the craft and cause the hull and engines and other devices and fittings on the craft to vibrate resulting in an increased maintenance requirement.

With respect to the synchronizing of two motors in a marine or other environment, there are a number of synchronizers commercially available. In particular, With respect to marine craft, the synchronizers adjust the speed of a slave motor with respect to the reference speed of a master motor. Both the slave and master motor are controlled by dual throttle levers or controls which are designed in such a way that the throttle levers can be moved in unison with one hand. Each of the throttle levers is connected by a control cable to a throttle arm located directly on the motor, which throttle arm is responsible for throttling the speed of the motor. The prior art synchronizers place a synchronizing unit in association with the cable to the slave motor. In effect, the slave cable has a first portion which provides an association between an electromechanical device of the synchronizers and the throttle lever and a second portion which provides an association between the electromechanical device and the slave motor. Such synchronizers are generally quite complex including a variety of springs, levers and gears and the movement of each portion of the slave cable is not directly linked to the movement of the other portion of the slave cable. In fact instrumentation for at least one of these devices directs the user to position the throttle lever for the slave motor to a maximum speed position and then to drive both motors using solely the throttle lever for the master motor. Such an arrangement has a disadvantage in that it requires that the synchronizer be continually synchronizing the motors. Further, these prior art devices have cumbersome engagement and disengagement procedures which can be inadvertently overlooked in environments such as docking and in traversing narrow or congested channels.

SUMMARY OF THE INVENTION

The present invention is designed to overcome the disadvantages of the prior art by providing an automatic motor synchronizer adapted for synchronizing (1) a slave motor operably coupled to a slave throttle lever through a slave cable and (2) a master motor operably coupled to a master throttle lever through a master cable. The synchronizer includes a first device in direct line with the slave cable for causing the cable to substantially simultaneously adjust the slave motor speed and the position of the slave throttle lever. Additionally, the synchronizer includes a second mechanism for determining the difference in speed between the master motor and the slave motor and a third mechanism for driving the first mechanism responsive to the speed difference determined by the second mechanism. The first mechanism includes a throttle rod having a first end and second end. The first end of the throttle rod is connected to a portion of a slave cable which is operably connected to the slave throttle lever so that the movement of the throttle lever moves the throttle rod. The throttle rod is additionally adapted for connecting to a second portion of the slave cable which is operably connected to the throttle arm of the slave motor so that movement of the throttle lever causes the speed of the slave motor to change.

The synchronizer includes a synchronization motor and a clutch and a mechanism for operably connecting the motor to the clutch and another mechanism for operably coupling the clutch to the throttle rod.

A central processing unit is provided for driving the synchronization motor responsive to the speed difference between the master and slave motors in order to move the throttle rod, thereby synchronizing the slave and master motors.

Associated with the central processing unit is a timer, a master sensor means for providing a first signal responsive to the speed of the master motor and a slave sensor means for providing a second signal responsive to the speed of the slave motor. Further an interrupt controller is provided for receiving the first and second signals and a means is provided for providing communication among the central processing unit, the timer and the interrupt controller. The interrupt controller provides signals to the central processing unit responsive to the first and second signals to cause the central processing unit to read time signals as provided by the timer in order to determine the difference in speed between the master motor and the slave motor.

Thus, it is an object of the present invention to provide a synchronizer for synchronizing the speed of a slave motor to that of a reference or master motor.

It is a further object of the present invention to provide a synchronizer which is directly in line with the cable connecting the slave throttle lever to the slave motor such that the slave throttle lever can override the synchronizer and the synchronizer can simultaneously position the throttle lever and throttle the slave motor so that throttle lever is always in a position relative to the speed of the motor.

It is a further object of the present invention to provide a synchronizer which is easy and convenient to operate and which is only engaged to synchronize the motors for a short interval until synchronization has occurred.

It is another object of the present invention to provide for a synchronizer which rapidly synchronizes the motors and which provides a display showing whether the motors are synchronized or not and the degree to which the motors are out of synchronization.

It is still another object of the present invention to provide for a synchronizer which is easy to place in operation and automatically disengages when synchronization has occurred so that in situations such as docking and tight maneuvering, there is no need to remember to disengage the synchronizer as the synchronizer will have already been disengaged once synchronization of the motors has occurred.

DETAILED DESCRIPTION OF THE PREFERRED EMBODIMENT

Figure 1:
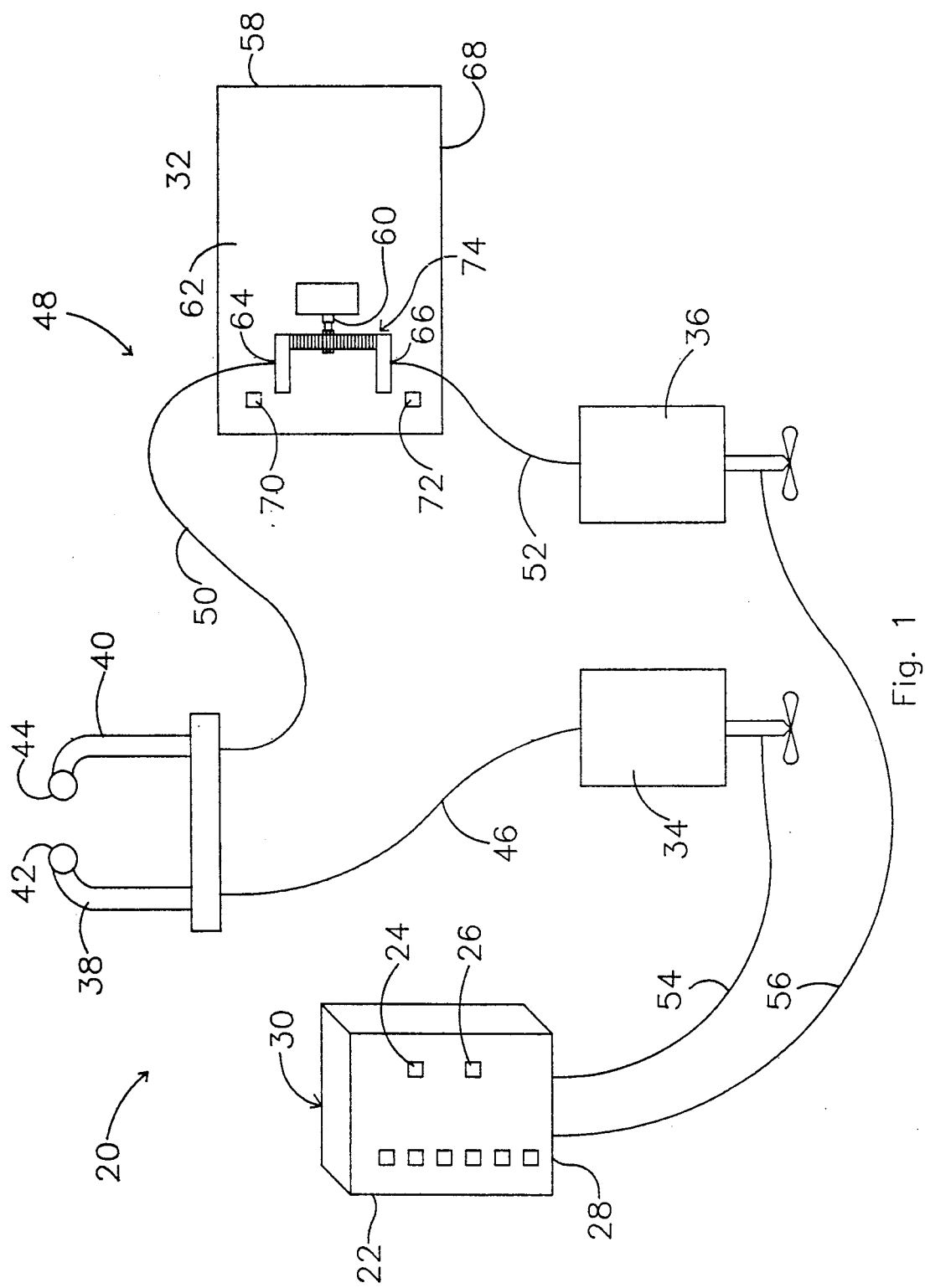
FIG. 1 depicts a schematical representation of an embodiment of the automatic motor synchronizer of the invention.
Figure 2:
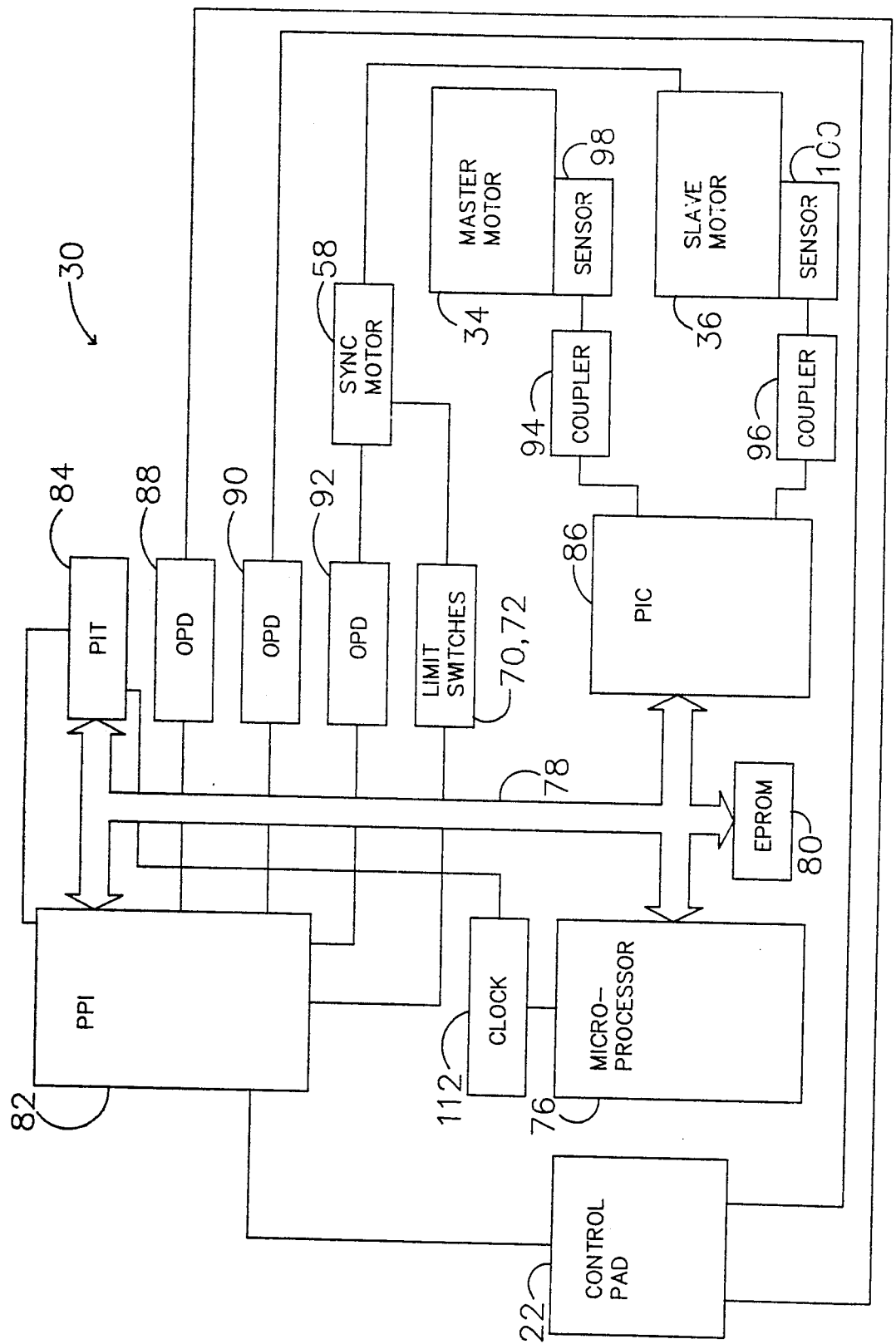
FIG. 2 depicts a schematic of an embodiment of the computer architecture of the automatic motor synchronizer of the FIG. 1.

With reference to the figures and in particular to FIG. 1 an automatic motor synchronizer 20 of the invention is depicted. The synchronizer includes a control pad 22 which a power on/off button 24, a synchronization button 26 and a light display 28 which indicates whether synchronization has occurred or to what degree the motors are unsynchronized. The control pad 22 houses the microprocessor system 30, as shown in FIG. 2, of the invention.

Also shown in FIG. 1 is the actuator mechanism 32 which is responsive to the microprocessor system 30 for causing motor synchronization.

In the environment of marine craft, wherein the craft has two marine engines such as for example, a master motor 34 and a slave motor 36, the operator is provided with dual motor throttle levers such as master throttle lever 38 and slave throttle lever 40. The levers generally approach each other at their distal bulbous ends 42, 44 such that an operator can use one hand in order to control the position of both of the levers so that when desired, such as during cruising operations, both motors can be set at approximately the same speed and both can be moved simultaneously between selected speeds.

As can be seen in FIG. 1, a master control cable 46 is provided between the master throttle lever 38 and the master motor 34 in order to directly control the speed of the master motor 34.

A slave control cable 48 is provided in two components. A first component 50 provides a direct linkage between the slave throttle lever 40 and the actuator mechanism 32 of the invention and a second component 52 provides a direct linkage between the actuator mechanism 32 and the slave motor 36. Further, communication cables 54, 56 are provided between the master and slave motor 34, 36 and the control pad 22 in order to communicate signals representative of the speeds of master and slave motors 34, 36 to the microprocessor system 30.

The actuator 32 includes, in a preferred embodiment, a bi-directional synchronization DC motor 58 which is operably coupled to an electrically actuated clutch 60. The actuator mechanism 32 further includes a throttle rod 62 and appropriate connectors for connecting the first component 50 of slave control cable 48 to a first end 64 of the throttle rod 62 and for connecting the second component 52 of the slave control cable 48 to the second end 66 of the throttle rod 62. The throttle rod 62 is appropriately mounted for bi-directional linear motion in the frame 68 between the first and second limit switches 70, 72. In a preferred embodiment, the electrically actuated clutch 60 is operably connected to the throttle rod 62 by a rack and pinion arrangement 74 where the rack is provided on the under side of the throttle rod 62 and the pinion is provided as an extension of the clutch 60. The clutch 60 has an override mechanism which allows the clutch to be overridden when additional force is placed on the slave motor lever 40.

The microprocessor system 30 of the invention as shown in FIG. 2 includes a central processing unit or CPU 76 which in a preferred embodiment is an 8088 chip. Appropriate bi-directional databus 78 communicates the CPU 76 with the memory media 80, which in a preferred embodiment can comprise a plurality of EPROMS, with a programmable peripheral interface 82, with a programmable interval timer 84 and with a programmable interrupt controller 86. The programmable peripheral interface 82 in turn communicates with first, second and third peripheral drivers 88, 90 and 92 which drives the light display 28 on the control pad 22, and operate the synchronization motor 58 as will be more fully described hereinbelow. The programmable interrupt control 86 is coupled through appropriate means such as opto-couplers 94, 96 to master motor speed sensor 98 and slave motor speed sensor 100, respectively.

Turning to FIGS. 3 through 9 which show the various components of FIGS. 1 and 2, it is to be understood that the numbers appearing at the ends of the leads on the right margins of the figures represent where the various leads should be connected with respect to other leads in other figures. Thus, by way of example only, turning to FIG. 7, the leads 31 and 41 should be communicated with leads 31 and 41 of FIG. 6.

Figure 7:
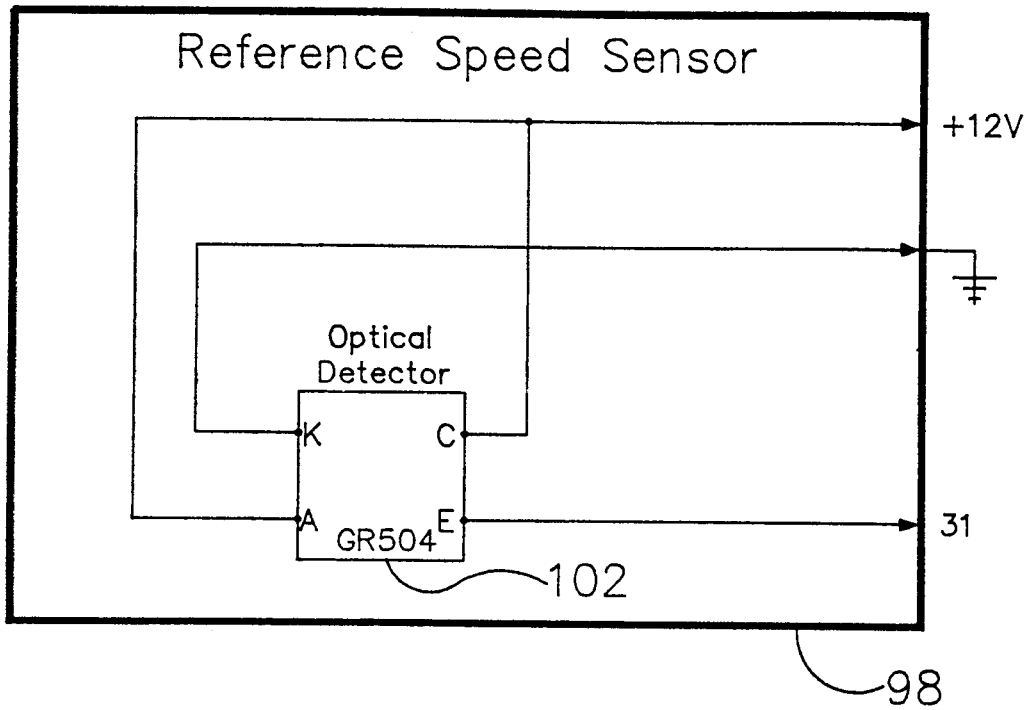
Figure 7:
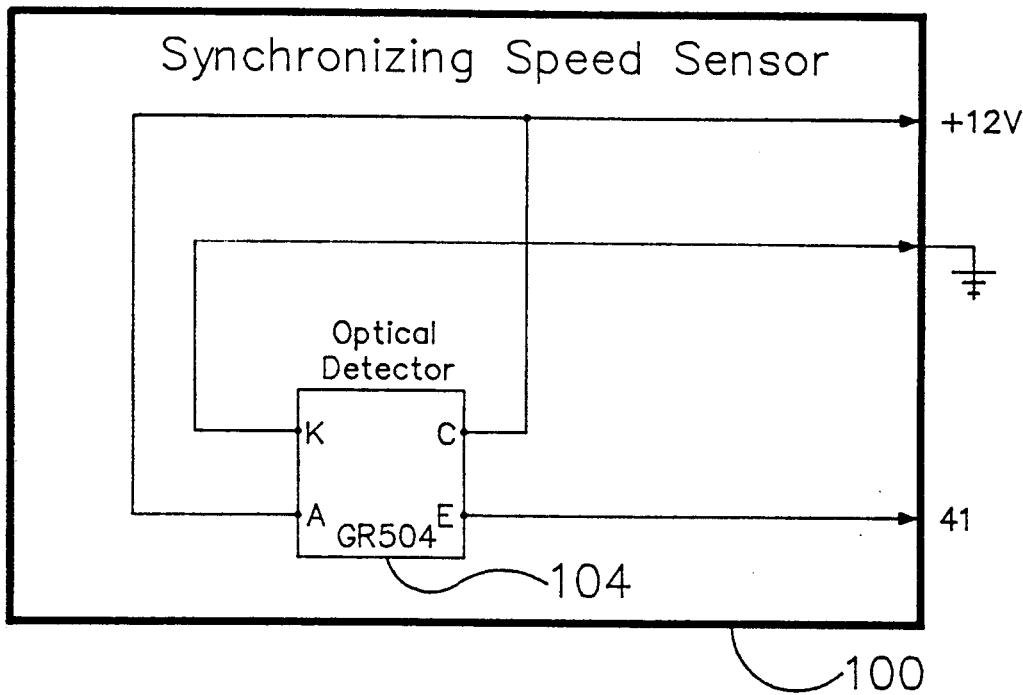

FIG. 7 depicts an optical detector 102 for the master motor speed sensor 98 and an optical detector 104 for a slave motor speed sensor 100. In a preferred embodiment, both speed sensors 98 and 100 include a spinning disc having slits. The spinning discs are operably coupled with the final drive shafts of the motors. A light can be detected by the optical detectors 102, 104 each time the slits in the discs rotates past the optical detectors 102, 104. The rotation of the discs has a known relationship with respect to the rotation of the final drives.

It is to be understood that other mechanisms for detecting the speed of the motors other than a spinning disc can be employed. Thus the motor speed sensors 98, 100 can in the alternative, detect sine signals from the alternator or generator of the motor or signals from harmonic balancers of the motors, or signals from the flywheels of the motors, or from other arrangements such as magnetic pickups which can be appropriately positioned relative to the motor.

Figure 3:
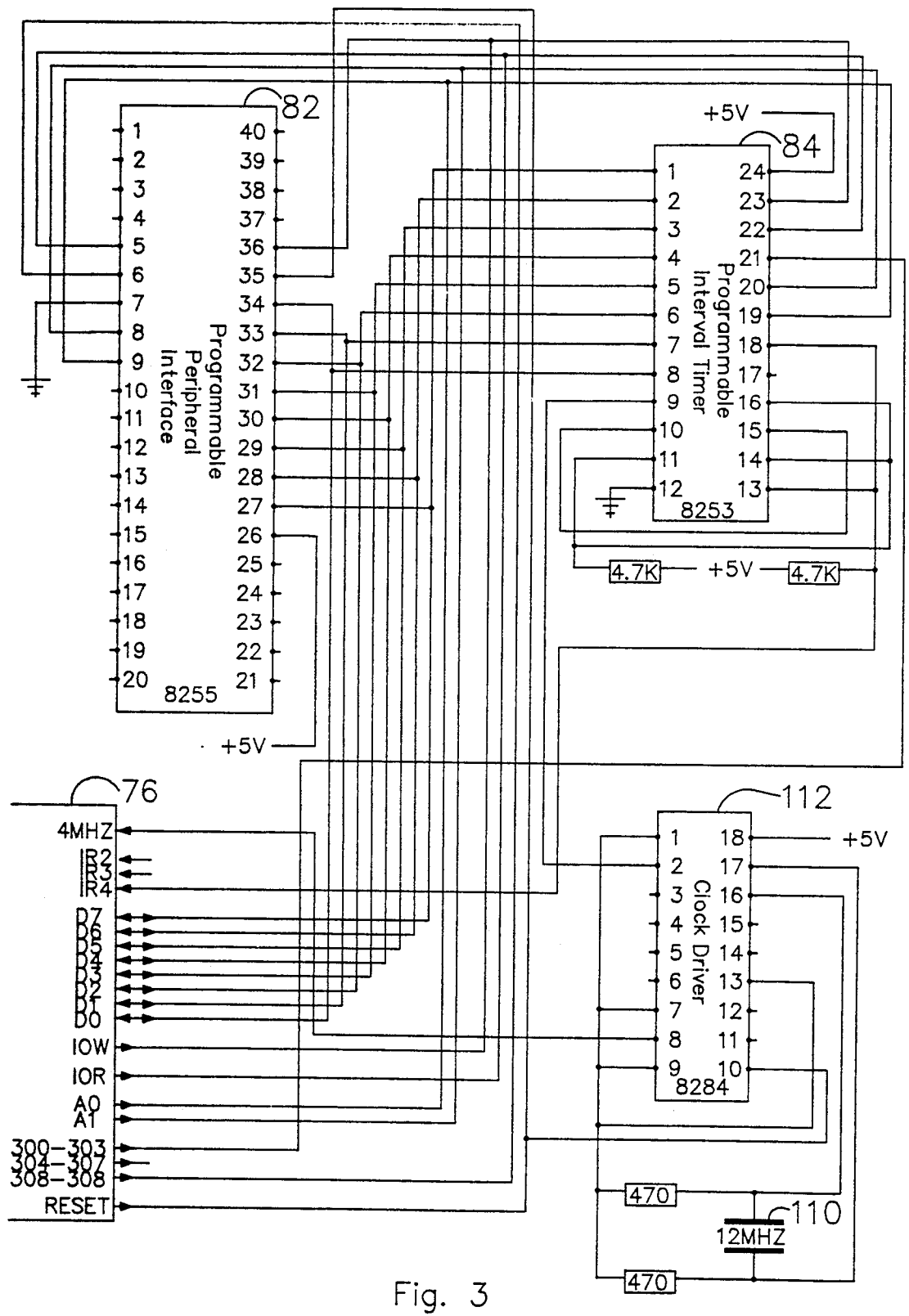
FIGS. 3, 4, 5, 6, 7, 8 and 9 represent schematical components of the architecture as shown in FIG. 2 and of the motor synchronizer as shown in FIG. 1.
Figure 6:
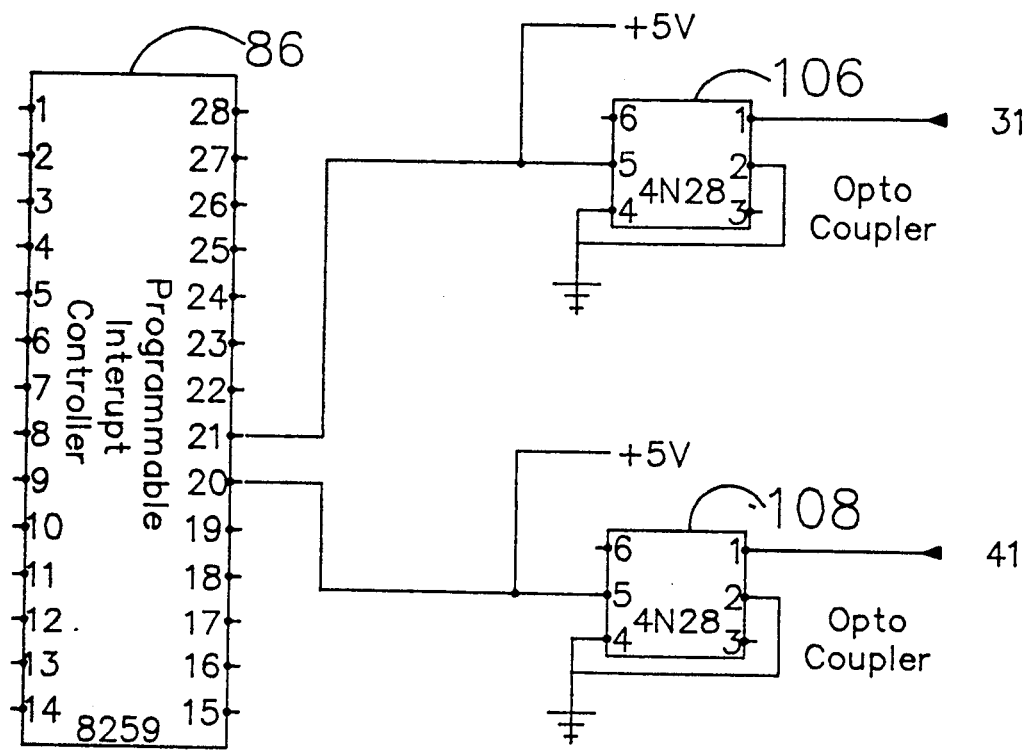

In a preferred embodiment, every time the optical detectors 102, 104 detect a light revealed by the slits in the disks, a twelve-volt signal is provided over appropriate leads 31, 41 to opto-coupler 106, 108 (FIG. 6). Opto-couplers 106, 108 are electrical devices for converting the twelve-volt signals from the sensor into five-volt signals appropriate for the CPU and the peripheral chips associated therewith. The five-volt signals from the opto-couplers 106, 108 are provided to the programmable interrupt control 86 as seen on FIG. 6. Data lines D0 to D7 communicate over the databus 78 with the CPU 76 and the programmable interval timer 84. Each time a slit is detected, the interrupt control 86 informs the CPU 76 of this event and the CPU 76 then reads a count as determined by the programmable interval timer 84. As can be seen in FIG. 3, a 12 megahertz crystal is used by clock driver 112. The clock driver 112 provides a 2 megahertz clock signal to the programmable interval timer 84 as previously identified. A 4 megahertz clock signal is provided to the CPU 76. Thus, under instructions from the interrupt controller 86, the CPU 76 interrogates interval timer 84 in order to determine a count. The differences in successive counts are proportional to the speed of the motor. Thus, for example if the motor was turning at 60 revolutions per minute which is equivalent to one revolution per second and if they were four slits on each disc, with each slit being disposed at 90° from the next adjacent slit, using a 2 megahertz clock, 500,000 counts would occur between the detection of two adjacent slits. That is to say that 500,000 counts represents the number of cycles which a 2 megahertz clock would go through during the quarter second it takes for each of the two adjacent slits to pass before the optical detector. Assuming that a motor was turning at 6000 revolutions per minute this would equate to 100 revolutions per second. Again assuming slits disposed 90° from each other, it would take 0.0025 seconds for the disc to traverse the 90° between the two adjacent slits which represents 5,000 counts with a 2 megahertz clock. Each of the pulses from the interrupt controller 86 directs the CPU 76 to, in turn, start and stop the clocks and the interval timer 84 in order to obtain these counts and therefrom determine the speed of both the master and slave motors 34, 36.

Figure 4:
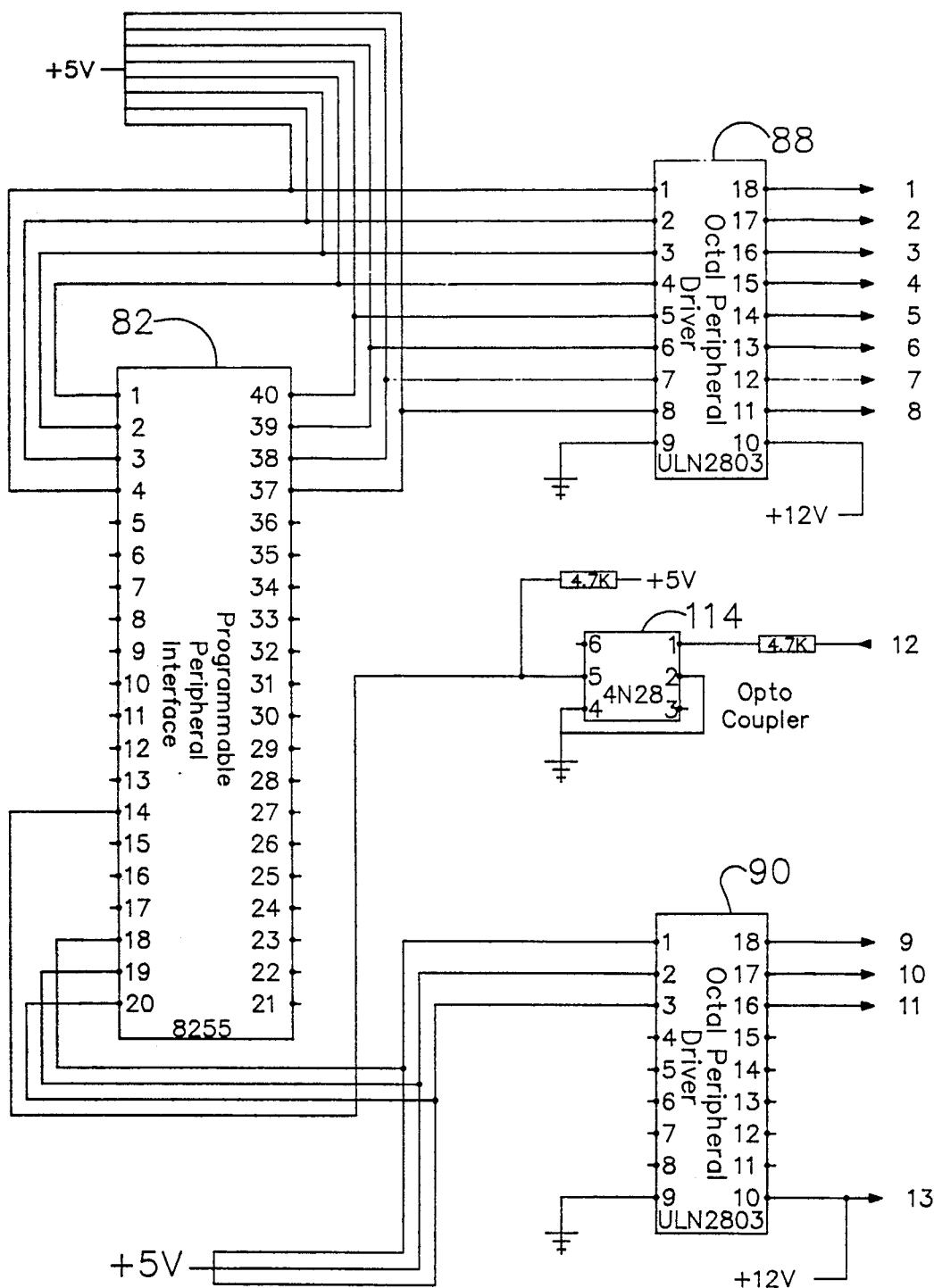
Figure 5:
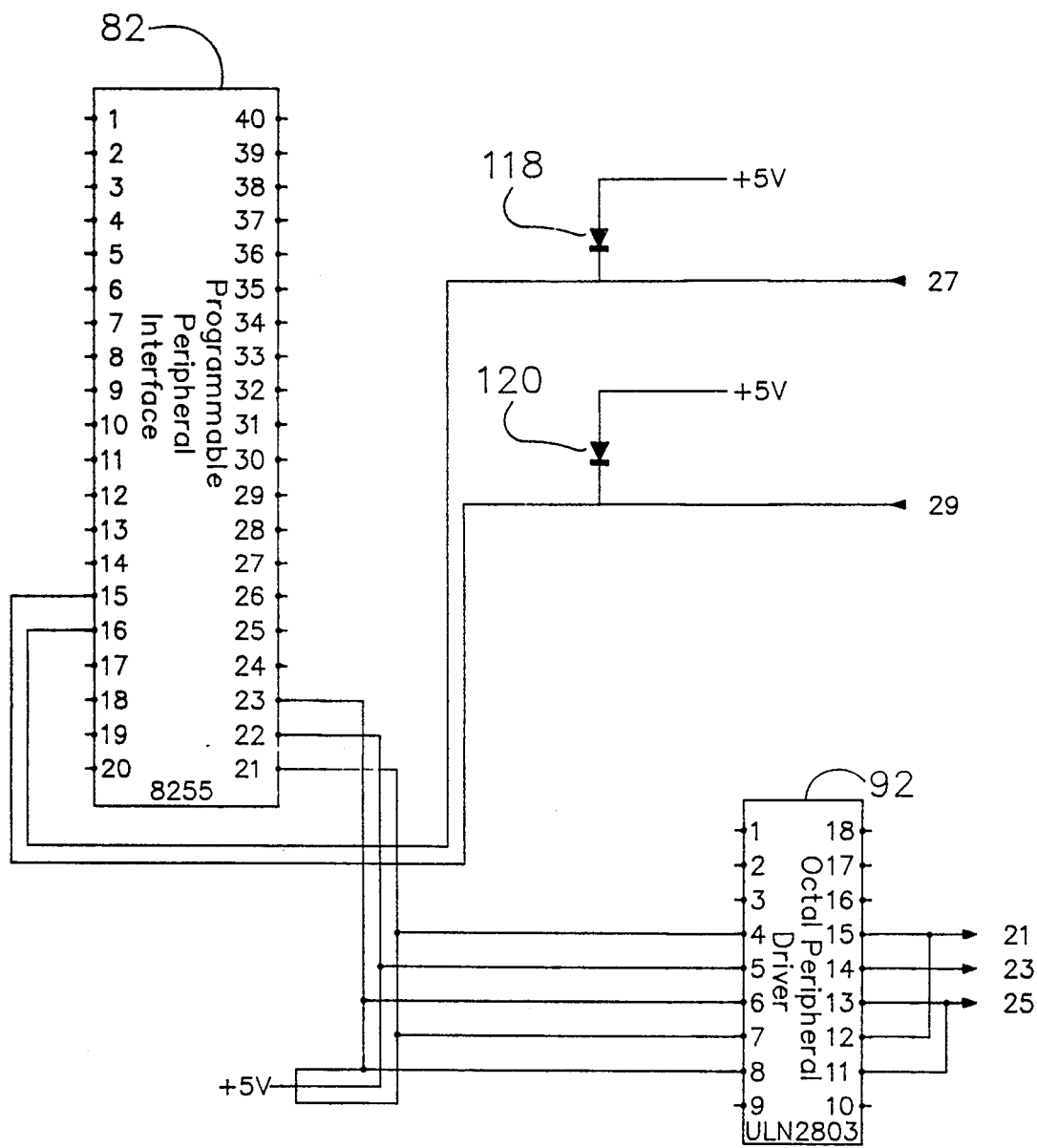
Figure 9:
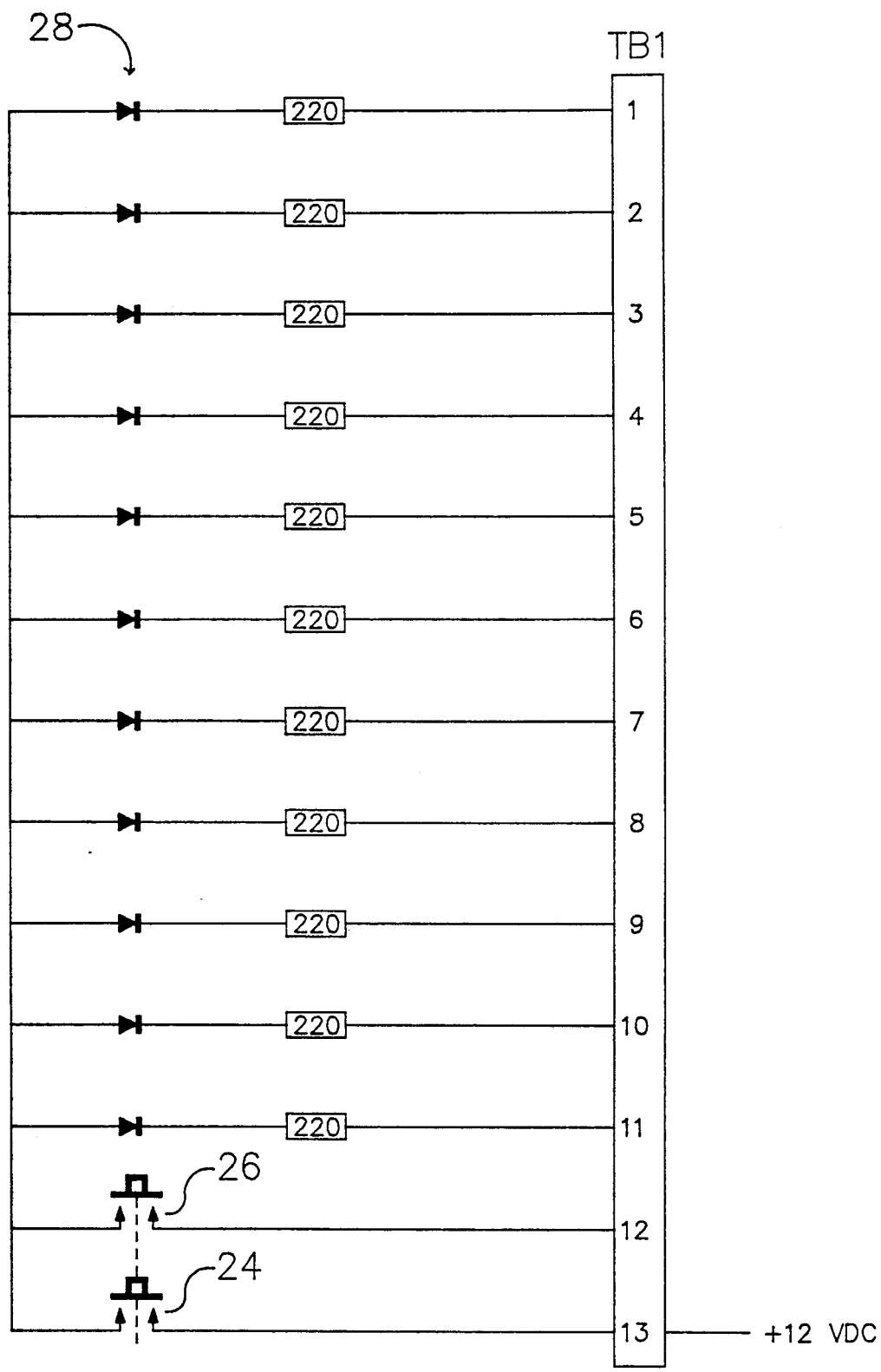

As can be seen in FIGS. 4 and 5 the programmable peripheral interface 82 operates the peripheral drivers 88, 90, 92. Peripheral drivers 88 and 90 control the light display 28 on the control pad 22 as shown in FIG. 9 where it is noted that the outputs numbered 1 through 13 from peripheral drivers 88, 90 are wired directly to the similarly numbered terminals for the light pad as identified in FIG. 9. It is noted that the terminal 12 does not go through a peripheral driver but instead is communicated with the synchronization switch or toggle switch 26 which communicates through an opto-coupler 114 (FIG. 4) through the peripheral interface 82. It is to be understood that the lights on the control panel operate under a twelve-volt system whereas again the CPU and peripheral chips associated with the CPU operate on a five-volt system. The opto-coupler 114 transforms a twelve-volt signal from the toggle or synchronization switch 26 to a five-volt signal for the programmable peripheral interface 82. Similar devices are appropriate in order to interface between the peripheral drivers 88, 90 and lights 28 on the control panel 22. As can be appreciated, under direction from the CPU 76 the peripheral interface 82 through the peripheral drivers 88, 90 direct current to the lights 28 for indicating that the master motor is 0.5%, 1%, 1.5% or 2% faster than the slave motor or that the master motor is 0.5%, 1%, 1.5% or 2% slower than the slave motor.

The third peripheral driver 92 provides appropriate control signals to the synchronization motor 58. As can be seen on FIG. 5, motor activation and motor direction signals are provided in order to actuate the synchronization motor 58 and also to determine whether the motor will be driven in either a clockwise direction or a counterclockwise direction. Further, a clutch engage signal is provided from the peripheral driver 92 to the electrically operated clutch 60 in order to allow the synchronization motor 58 to be operably engaged with the throttle rod 62. Again, the peripheral driver 92 is operated based on instructions from the peripheral interface 82 which in turn is instructed by the CPU 76 dependent on the difference in the speeds of the master and slave motor as calculated by the CPU 76.

Figure 8:
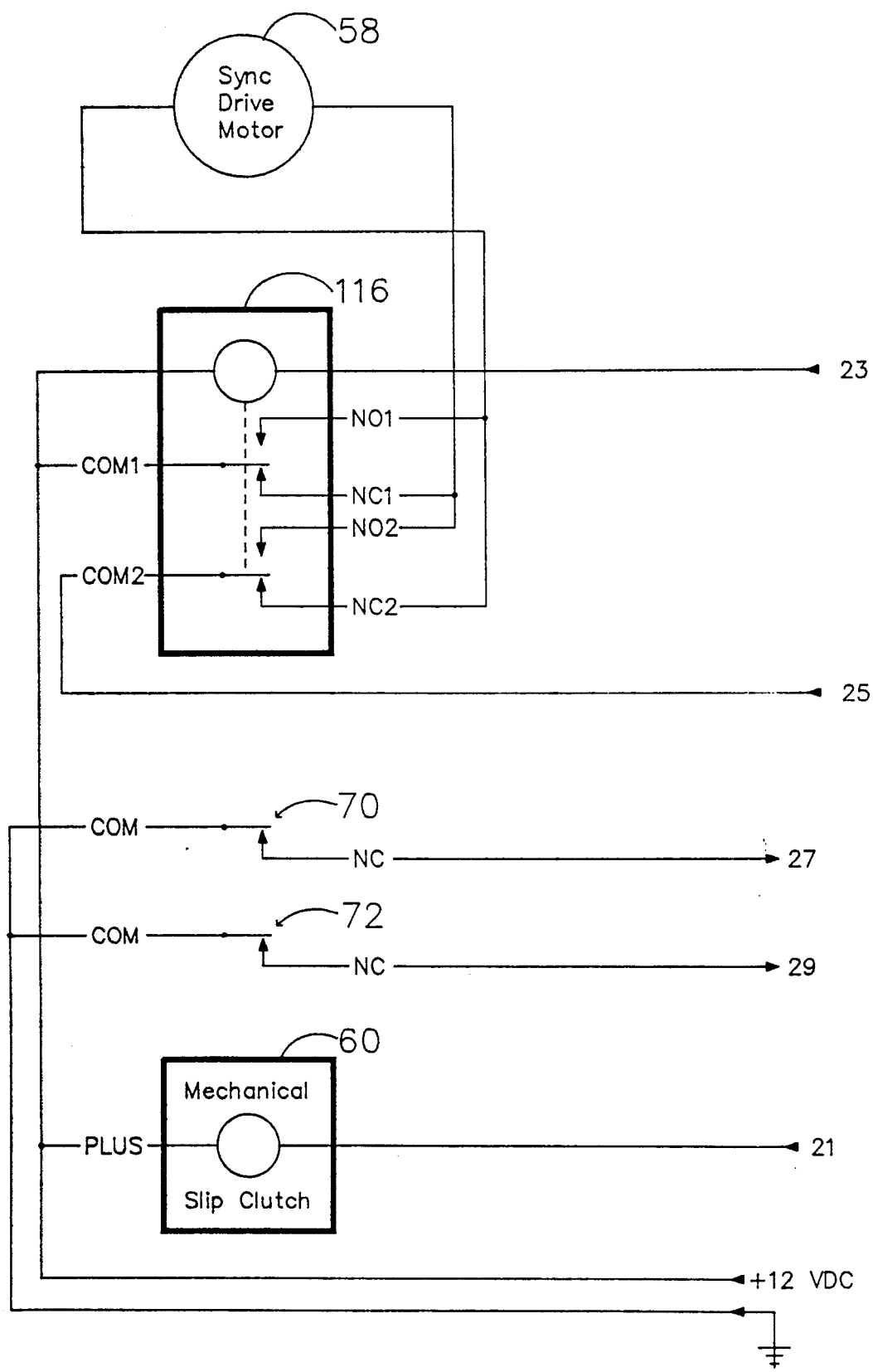

FIG. 5 further discloses that the limits switches 70, 72 shown in FIG. 1 and FIG. 8 communicate through the peripheral interface 82 to the CPU 76. Should the throttle rod 62 exceed or trip either of the limit switches, the CPU 76 turns off the synchronization motor 58. The limit switches are set at maximum and minimum slave motor speeds so that the slave motor is never driven past its operational maximum speed or its operational minimum speed. Should this occur, the CPU 76 would turn off the synchronization motor 58 and only turn it on again for operating in a direction to cause the throttle rod 62 to move away from the limit switch that was just tripped. FIG. 8 depicts schematically the synchronizer motor 58 and the electrically actuated clutch 60 of FIG. 1 in addition to the aforementioned limit switches 70, 72. It can be seen in FIG. 8 that the engagement clutch signal is provided on trace 21 to the clutch 60 and that the motor direction and actuation signals 23, 25 are provided on the defined traces to relay switch 116 which operates the synchronization motor 58. The relay switch 116 energizes the synchronization motor 58 and causes the selection of the direction of the motor 58.

Industrial Applicability

The operation of the automatic motor synchronizer 20 of the invention is as follows. Initially the master and slave motors 34, 36 are started under normal procedures characteristic for those motors. Once it is desired to synchronize the motors as for example when a long distance is to be traversed at a set speed, the throttle levers 38, 40 for the master and slave motor are brought together at the desired location for the approximate motor speed. The automatic motor synchronizer 20 is turned on by pressing the power switch 24. This enables the operator to view the light display 28 to roughly determine to what degree the motors are synchronized. This is for informational purposes only as once it is desired to synchronize the motors, all that need be done is to place the throttle levers 42, 44 at about the same speed position and push the synchronization button 26. The automatic motor synchronizer 20 then automatically synchronizes the slave motor to the master motor by causing the throttle rods 62 to move, directly moving the slave throttle lever 44 and throttling the slave motor 36 until synchronization has occurred. Generally synchronization occurs in substantially under a period of one second. Once synchronization has occurred, the electrical clutch 60 disengages the synchronization motor 58 from the throttle rod 62. The synchronization button and light is no longer lit; however, the automatic motor synchronizer 20 is still powered. At this point, the motors are synchronized until the throttle levers are again moved to accomplish a desired maneuver. Once the maneuver is finalized, the throttle levers can again be position substantially adjacent each other and the synchronization button pushed to substantially instantaneously synchronization the motors. As synchronization occurs quite rapidly, it is highly unlikely that there will ever be a need to override the automatic motor synchronizer 20 during synchronization by use of the throttle lever 44. However, should the need arise, through the exertion of additional force on the lever 44, the throttle rod 62 can be caused to slip relative to the clutch 60 thereby manually affecting the speed of the slave motor 36.

From the above it can be seen that the present invention provides for a direct link between the slave throttle lever 44, through a throttle rod 62, to the slave motor 36. Further, it can be further seen that synchronization occurs rapidly and that once synchronization has occurred, the synchronizer shuts off so that normal motion of the throttle levers can be accomplished when need as for example during docking, without having to consider whether the synchronizer is on or off. Also, it can be seen that the synchronizer can be easily overridden with the slave throttle lever 44 should the necessity for an override occur. Additionally, it is evident that the throttle arm 44 for the slave motor is always provided in a position which represents the speed of the slave motor, giving the operator a visual sense of the speed of the motor at all times.

Other objects and aspects of the invention can be obtained from a review of figures and appended claims.

It is to be understood that other embodiments of the invention can be devised that fall within the spirit and scope of the claims as appended hereto.

We claim:

1. An automatic motor synchronizer adapted for synchronizing (1) a slave motor operably coupled to a slave throttle lever through a slave cable, and (2) a master motor operably coupled to a master throttle lever through a master cable, comprising:

first means in direct line with the slave cable for causing said cable to substantially simultaneously adjust the slave motor speed and the position of the slave throttle lever and for continuously maintaining the slave motor directly coupled to the slave throttle lever;

second means for determining the difference in speed between the master motor and the slave motor;

third means for driving the first means responsive to the second means.

2. The synchronizer of claim 1 wherein the slave cable has a first linkage and a second linkage and wherein the first means include:

a throttle rod having a first end and a second end;

means adapted for connecting said first end of said throttle rod to the first linkage which is operably connected to the slave throttle lever so that the movement of the slave throttle lever moves the throttle rod;

means adapted for connecting said second end of said throttle rods to the second linkage which is operably connected to the slave motor so that movement of the throttle lever causes the speed of the slave motor to change; and wherein said third driving means is for displacing the throttle rod response to the difference in speed between the master motor and the slave motor as determined by the second means.

3. The synchronizer of claim 2 wherein the first means includes:

a synchronization motor;
a clutch;
means for operably coupling the synchronization motor to said clutch;
means for operably coupling the clutch to the throttle rod.

4. The synchronizer of claim 3 wherein said means for operably coupling the clutch to the throttle rod includes a rack and pinion arrangement.

5. The synchronizer of claim 3 wherein said clutch includes means for selectively causing said clutch to become engaged and means for overriding said clutch.

6. The synchronizer of claim 2 including:

limit switch means for limiting the travel of the first end and the second end of the throttle rod.

7. The synchronizer of claim 2 wherein: the means for determining the difference in speed between the master motor and the slave motor includes:

a central processing unit;
a timer
a master sensor means for providing a first signal responsive to speed of the master motor;
a slave sensor means for providing a second signal responsive to the speed of the slave motor;
an interrupt controller for receiving the first and second signals;
means for providing communications among the central processing unit, the timer and the interrupt controller;
said interrupt controller for providing signals to the central processing unit responsive to the first and second signals to cause the central processing unit to read time signals as provided by the timer in order to determine the speed of the master motor and the slave motor.

8. The synchronizer of claim 7 wherein said first means include:

a synchronization motor;
a clutch;
a means for operably coupling the synchronization motor to the said clutch;
a means for operably coupling the clutch to the throttle rod; and further including:
said third driving means for driving said motor to displace said throttle rod responsive to the speed difference between the master motor and slave motor.

9. The synchronizer of claim 8 including limit switch means for establishment where one of the first end and the second end of the throttle rod has reached a preestablished limit; and said central processing unit for causing the third driving means to cease driving said motor when the limit switch means has established that the throttle rod has reached a preestablished limit.

10. The synchronizer of claim 7 including:

light means for visually indicating the difference in speed between the master motor and the slave motor, responsive to a signal from the central processing unit indicating said difference in speed between the master motor and slave motor.

11. An automatic motor synchronizer adapted for synchronizing (1) the speed of a slave motor operably coupled to a slave throttle lever and (2) the speed of a master motor operably coupled to a master throttle lever, comprising:

a throttle rod having a first end and a second end;
said throttle rod adapted for connecting said first end of said throttle rod to a first linkage which is operably connected to the slave throttle lever so that movement of the throttle lever moves the throttle rod;
said throttle rod adapted for connecting said second end of said throttle rod to a second linkage which is operably connected to the slave motor so that movement of the throttle lever causes the speed of the slave motor to change, and so that the slave motor is continuously maintained directly coupled to the slave throttle lever;

means for determining the difference in speed between the master motor and the slave motor;

means for displacing the throttle rod response to the difference in speed between the master motor and the slave motor as measured by the determining means.

12. The synchronizer of claim 11 wherein the displacing means includes:

a synchronization motor;

a clutch;

a third means for operably coupling the synchronization motor to said clutch;

means for operably coupling the clutch to the throttle rod.

13. The synchronizer of claim 12 wherein said means for operably coupling the clutch to the throttle rod includes a rack and pinion arrangement.

14. The synchronizer of claim 12 wherein said clutch includes means for selectively causing said clutch to become engaged and means for overriding said clutch.

15. The synchronizer of claim 11 including:

limit switch means for limiting the travel of the first end and the second end of the throttle rod.

16. The synchronizer of claim 11 wherein the means for determining the difference in speed between the master motor and the slave motor includes:

a central processing unit;

a timer;

a master sensor means for providing a first signal responsive to the speed of the master motor;

a slave sensor means for providing a second signal responsive to the speed of the slave motor;

an interrupt controller for receiving the first and second signals;

a means for providing communications among the central processing unit, the timer and the interrupt controller;

said interrupt controller for providing signals to the central processing unit responsive to the first and second signals to cause the central processing unit to read time signals as provided by the timer in order to determine the speed of the master motor and the slave motor.

17. The synchronizer of claim 16 wherein:

said displacing means includes:

a synchronization motor;

a clutch;

means for operably coupling the synchronization motor to said clutch;

means for operably coupling the clutch to the throttle rod so that with the clutch engaged, the motor can drive the throttle rod responsive to the speed difference between the master motor and slave motor as determined by the determining means.

18. The synchronizer of claim 17 including limit sWitch means for establishing when one of the first end and the second end of the throttle rod has reached a preestablished limit; and said central processing unit for ceasing the movement of said synchronization motor when the limit switch means has established that the throttle rod has reached a preestablished list.

19. The synchronizer of claim 16 including:

light means for visually indicating the difference in speed between the master motor and the slave motor and responsive to a signal from the central processing unit indicating said difference in speed between the master motor and the slave motor.

20. An automatic motor synchronizer adapted for synchronizing (1) a slave motor operably coupled to a slave throttle lever through a slave cable, and (2) a master motor operably coupled to a motor throttle lever through a master cable, comprising:

(a) first means in direct line with the slave cable for causing said cable to substantially simultaneously adjust the slave motor speed and the position of the slave throttle lever and for continuously maintaining the slave motor directly coupled to the slave throttle lever;

(b) second means for determining the difference in speed between the master motor and the slave motor, wherein said second determining means includes:

a central processing unit;

a timer;

a master sensor means for providing first signals responsive to the speed of the master motor;

a slave sensor means for providing second signals responsive to the speed of the slave motor;

an interrupt controller for receiving the first and second signals;

a means for providing communications among the central processing unit, the timer and the interrupt controller;

said interrupt controller for providing signals to the central processing unit responsive to the first and second signals to cause the central processing unit to read time signals as provided by the timer in order to determine the speed of the master motor and the slave motor; and (c) third means for driving the first means responsive to the second means.

21. The synchronizer of claim 20 wherein said first means includes:

a synchronization motor;

a clutch;

means for operably coupling the synchronization motor to said clutch;

means for operably coupling the clutch to the throttle rod.

* * * * *